United States Patent [19]

Takahashi et al.

[11] Patent Number: 5,073,406
[45] Date of Patent: Dec. 17, 1991

[54] METHOD OF PRODUCING A MAGNETIC RECORDING MEDIUM

[75] Inventors: Masatoshi Takahashi; Hiroo Inaba; Kazuaki Taga, all of Kanagawa, Japan

[73] Assignee: Fuji Photo Film Co., Ltd., Kanagawa, Japan

[21] Appl. No.: 682,767

[22] Filed: Apr. 9, 1991

[30] Foreign Application Priority Data

Apr. 10, 1990 [JP] Japan .................................. 2-94655

[51] Int. Cl.$^5$ ............................................ H01F 10/02
[52] U.S. Cl. ..................................... 427/131; 427/132
[58] Field of Search ................................ 427/131, 132

Primary Examiner—Bernard Pianalto
Attorney, Agent, or Firm—Sughrue, Mion, Zinn, Macpeak & Seas

[57] ABSTRACT

A method of producing a magnetic recording medium comprises the steps of kneading and dispersing ferromagnetic powder, binder and non-ferromagnetic powder to obtain magnetic coating solutions, and applying a plurality of the magnetic coating solutions on a non-ferromagnetic substrate to form a plurality of magnetic layers on the substrate. In the kneading and dispersing step, a magnetic coating composition containing a ferromagnetic powder and a solvent of 15 to 30 wt % of the ferromagnetic powder is kneaded by a two-shaft continuous kneading and mixing machine and then dispersed by a pin type sand grinder to obtain a first magnetic solution. Another magnetic coating composition containing a ferromagnetic powder and a solvent of 30 to 50 wt % of the ferromagnetic powder is kneaded by a double-arm open kneader and then dispersed by a pin type sand grinder, and finally dispersed by a disk type sand grinder to obtain a second magnetic coating solution. In the magnetic solution applying step, the first magnetic coating solution is at first applied on said substrate and then the second magnetic coating solution is applied thereon.

14 Claims, 2 Drawing Sheets

METHOD OF PRODUCING A MAGNETIC RECORDING MEDIUM

BACKGROUND OF THE INVENTION

1. Field of the Invention

This invention relates to a method of producing a magnetic recording medium having a multi-layer structure.

2. Description of the Prior Art

A magnetic recording layer for a magnetic recording medium of multi-layer structure which has high high-frequency performance and tremendously improved recording sensitivity has been broadly used. There is always a desire to improve the material used in this kind of magnetic recording medium and in the method of orientation of the magnetic material as well as in the electromagnetic performance thereof. A video tape is an example of one of the multiple-structure recording media used for short-wavelength recording and in which the video signals are recorded in the surface region of the magnetic layer. Therefore, it is necessary to smooth the surface of the magnetic layer and enhance the residual magnetic flux density in the video tape.

Further, it is also desired to lower the manufacturing cost of the recording medium as well as improve the performance such as the density or S/N ratio. Therefore, it has been practiced to smooth the surface of the coating layer by use of a super-calender roll at a higher temperature and a higher pressure as a surface treatment to smooth the surface of the magnetic layer of a video tape and to increase the residual magnetic flux density. It is also known to finely divide the magnetic powder to be kneaded for the same purpose.

However, in this kind of surface treatment, it has not been possible to make a magnetic layer having both the surface smoothness and the high residual magnetic flux density as desired as well as a magnetic recording medium for video recording at a low manufacturing cost.

The magnetic layer is prepared by kneading an organic solvent containing magnetic powder and a binder to form a magnetic coating material and applying the magnetic coating material on a substrate. At the time of kneading, the magnetic coating material is subjected to high shear force to increase the residual magnetic flux density. However, the magnetic coating material obtained by kneading under a high shear force is likely to have a rough surface when it is applied on the substrate. Therefore, it has been difficult to obtain a magnetic layer having a smooth surface and a high residual magnetic flux density.

Therefore, it has been proposed to make a double-structured magnetic layer having an upper layer and lower layer containing different residual magnetic flux densities (Br). For example, it has been known to provide an upper layer of high residual magnetic flux density filled with iron nitride having a high residual magnetic flux density (Br) and on a lower layer having a high surface smoothness filled with less iron oxide containing cobalt. However, it is not desirable from the viewpoint of manufacturing to use the different kinds of ferromagnetic material in the two magnetic layers, which will raise the manufacturing cost. Therefore, it has also been proposed to use the same ferromagnetic material for the two magnetic layers but changing the method of making the magnetic coating material for the two layers, wherein the magnetic coating material used for the lower layer is made by kneading an organic solvent containing magnetic powder and a binder with a kneader of low shear force, and then dispersing it in a wet medium dispersion mixer, and the magnetic coating material used for the upper layer is made by kneading the same organic solvent as the solvent for the lower layer with a kneader of high shear force, and then dispersing it in a wet medium dispersion mixer. The kneader having a high shear force is known, as a two-shaft continuous kneading and mixing machine which is able to knead at a high filling rate, and the kneader having a low shear force is known as a batch type double arm kneader or the like.

In the above-described double-layer structured magnetic recording layer, the lower layer is desired to have as high a filling rate as possible using a magnetic body of high magnetization rate so as to be suited for long wavelength recording having a large recording depth; and the upper layer is desired to have as high a filling rate as possible using finely divided ferromagnetic powder having high coercive force so as to lower the noise level and to be suited for short wavelength recording having small recording depth. The upper layer is, however, different from the lower layer, because it is brought into direct contact with the recording head or the tape guide in the recording deck. Accordingly, a high surface smoothness is not desired because if the material is kneaded too much and dispersed to obtain a high filling rate, the surface of the magnetic layer is smoothed and lowers the sliding performance while it improves the electromagnetic conversion characteristics. Further, the finely divided magnetic body is likely to be deformed in the course of kneading to lower the magnetic characteristics. That is, both the upper and lower layers must be subject to the appropriate manufacturing processes, respectively, so that, the purpose of making the double-layer structured magnetic layer is to provide high magnetic characteristics and enhanced running durability of the magnetic recording medium.

SUMMARY OF THE INVENTION

The inventors of this invention have discovered, after keen research of the method of kneading, dispersing and coating of the respective layers, that an excellent magnetic medium can be obtained by combining a particular dispersing method and a coating method with a particular kneading method.

Accordingly, the main object of the present invention is to provide a method of producing a magnetic recording medium having a multi-layer structure capable of providing high electromagnetic conversion characteristics and a high running durability.

The method of producing a magnetic recording medium in accordance with the present invention comprises the steps of kneading and dispersing ferromagnetic powder, binder and non-ferromagnetic powder, and applying a plurality of magnetic coating solutions on a non-ferromagnetic substrate to form a plurality of magnetic layers on the substrate wherein, in the step of said kneading and dispersing, a magnetic coating composition containing said ferromagnetic powder and a solvent of 15 to 30% by weight of the ferromagnetic powder is at first kneaded by a two-shaft continuous kneading and mixing machine and then dispersed by a pin type sand grinder to obtain a first magnetic solution. Another magnetic coating composition containing said ferromagnetic powder and a solvent of 30 to 50% by weight of the ferromagnetic powder is at first, kneaded by a double-arm open kneader and then dispersed by a pin type sand grinder, and finally dispersed by a disk-type sand grinder to obtain a second magnetic coating solution, and, in the step of said applying the magnetic solutions on the non-ferromagnetic substrate, said first magnetic coating solution is applied on said substrate and then said second magnetic coating solution is applied thereon.

By this method, for the magnetic coating solution for the lower layer, the two-shaft continuous kneading and mixing machine having a high power of kneading is used for improving the surface property by increasing the filling density and the pin type sand grinder is used for further efficiently dispersing the components, and for the magnetic coating solution for the upper layer, the double-arm open kneader having a moderate kneading power is used for obtaining a moderate filling density, and the pin type sand grinder is used for rapidly dispersing the components and then the disk type sand grinder is used for finally dispersing the composition. If the filling density is increased too much in the upper layer, the surface of the upper layer becomes too smooth, which deteriorates the running durability of the magnetic recording medium, and if the filling density is lowered too much, the sensitivity is lowered. By combining the kneading and dispersing methods properly as defined, above, both the electromagnetic conversion characteristics and the running durability are improved.

The present invention can be carried out in the form of the following preferred embodiments.

1) A method of manufacturing a magnetic recording medium characterized in that said upper layer coating solution and said lower layer coating solution are applied on the substrate by means of a double coating method while the lower layer is wet.
2) A method of producing a magnetic recording medium in which the ferromagnetic powder in the upper layer coating solution has a specific surface of $30m^2/g$ or more as determined by the BET procedure and a crystal size of 400Å or less; the ferromagnetic powder in the lower layer coating solution has a specific surface of $45m^2/g$ or less as determined by the BET procedure and a crystal size of 290Å or more; and the specific surface of the ferromagnetic powder in the upper layer coating solution is greater than that of the ferromagnetic powder in the lower layer coating solution by 5 $m^2/g$ or more.
3) A method of producing a magnetic recording medium in which Hc of the ferromagnetic powder in the upper layer coating solution is 1000Oe or less; Hc of the ferromagnetic powder in the lower layer coating solution is 300Oe or more; and the difference of Hc between the ferromagnetic powder in the upper layer coating solution and the ferromagnetic powder in the lower layer coating solution is on the order of 50-200Oe.
4) A method of producing a magnetic recording medium in which the ferromagnetic powder in the upper layer coating solution is cobalt-modified $\gamma$-$Fe_2O_3$, and the ferromagnetic powder in the lower layer coating solution is $\gamma$-$Fe_2O_3$ or cobalt-modified $\gamma$-$Fe_2O_3$.
5) A method of producing a magnetic recording medium in which the binder used in each of the upper and lower layer coating solutions comprises a vinyl chloride vinyl acetate copolymer and polyester polyurethane, and the total amount of the binder used is 15-30 wt % relative to the ferromagnetic fine particles. Polyisocyanate compounds may be added to each of the coating solutions in an amount of 1-10 wt % relative to the ferromagnetic fine particles to carry out crosslinking processing.
6) A method of producing a magnetic recording medium in which the carbon black included in the upper layer coating solution has an average particle size ranging from 20 m$\mu$ to 80 m$\mu$ and is included in an amount of 0.5–10 wt % relative to the ferromagnetic fine particles. Additional carbon black having an average particle size ranging from 80 m$\mu$ to 300 m$\mu$ may be included in amount less than 0.5 wt % relative to the ferromagnetic fine particles together with the aforementioned carbon black. The carbon black may or may not be included in the lower layer coating solution. The carbon black included in the lower layer coating solution, if any, has an average particle size of 80 m$\mu$ or less and is included in an amount of 10 wt % or less.
7) A method of producing a magnetic recording medium in which the thickness of the upper layer is 3.0 $\mu$m or less and the thickness of the lower layer is 2.0 $\mu$m or more.
8) A method of producing a magnetic recording medium in which an abrasive having a Mohs hardness of 7 or more is included in each of the upper and lower layer coating solutions. The lower layer coating solution may not include the abrasive according to the situation.
9) A method of producing a magnetic recording medium in which the total amount of the lubricant included in the upper layer coating solution is equal to or greater than the total amount of the lubricant included in the lower layer coating solution.

The present invention will now be described in detail hereinbelow.

For kneading the first magnetic coating solution, a two-shaft kneading and mixing machine is used. The two-shaft kneading and mixing machine comprises a material supplying portion such as a hopper, a kneading chamber retaining a couple of shafts and blade members provided thereon (such as paddles or shallow grooved screws) and a material discharging portion, and continuously discharges a kneaded organic solvent solution.

The desirable shape of the paddle suitable for use in kneading the magnetic coating solution for the lower magnetic layer is a rounded triangle. The two-shaft continuous kneading and mixing machine is capable of obtaining a strong kneading power as compared with the double-arm open kneader, and accordingly, is able to accomplish the high filling density. Further, at the time of kneading, the amount of the solvent is desirable to be 15 to 30 wt % of the ferromagnetic powder. If it is lower than 15%, the kneading cannot be conducted efficiently. If it could be conducted, heat would be tremendously generated, which would be a problem from the viewpoint of safety. If it is over 30%, it is difficult to strongly knead the composition, and the high filling density cannot be accomplished. The further desirable range of the amount of the solvent is 20 to 28 wt %. The flow rate of the treated magnetic material is 3 kg/min to 20 kg/min.

Figure 1:
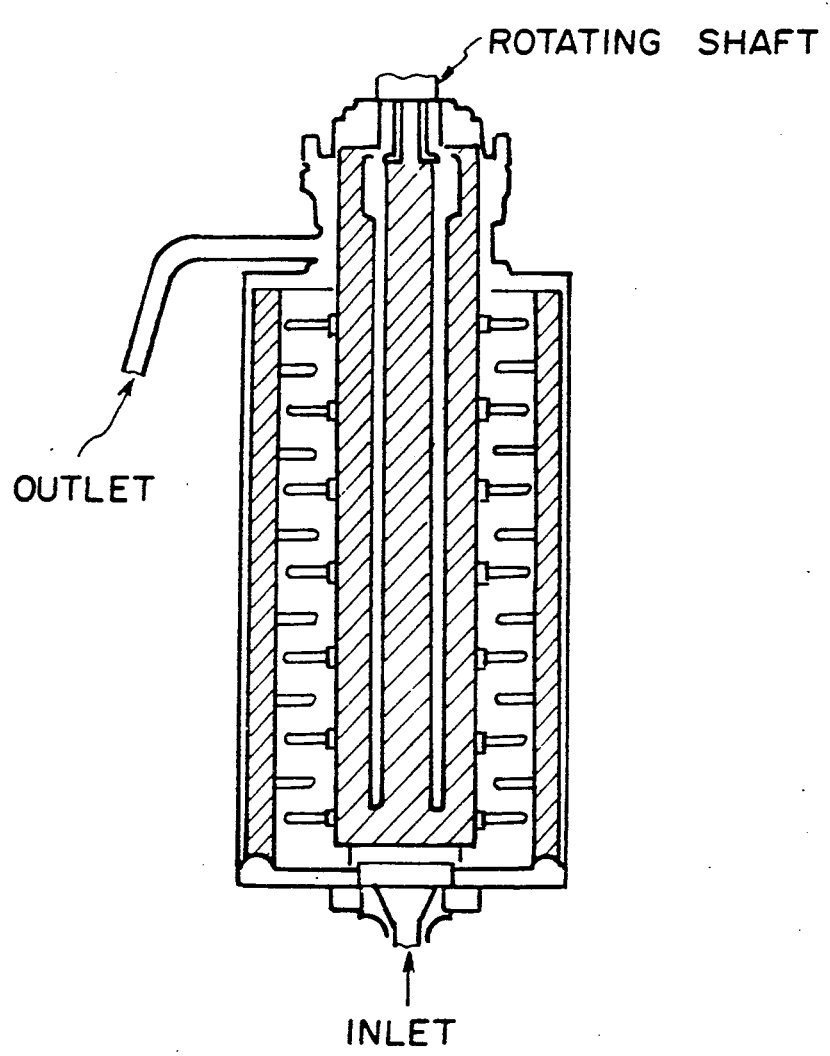
FIG. 1 illustrates a schematic view showing the structure of the pin type sand grinder.

Then, the kneaded solution thus prepared is dispersed by a pin type sand grinder. The pin type sand grinder has a structure as shown in FIG. 1.

For kneading the second magnetic coating solution for the upper magnetic layer, a batch type double arm kneader which has a low shear force is used. The batch type kneader is suitable for kneading a high viscous material and is capable of selecting the shape and the rotating speed of the two blades in view of the situation. For kneading the magnetic coating solution for the upper magnetic layer, the blades of sigma shape is particularly suitable.

For producing the upper layer coating solution, a double-arm open kneader is used. The double-arm open kneader is able to obtain a strong kneading power as compared with the two-shaft continuous kneading and mixing machine, but is able to obtain favorable surface properties for the desired running durability and the moderate filling density. Further, in the kneading step, the amount of solvent is desired to be 30 to 50 wt % of the ferromagnetic powder. If it is less than 30 wt %, it is difficult to conduct the kneading process. If it could be kneaded, it would take a long time, which is undesirable from the viewpoint of the manufacturing efficiency. If it is over 50 wt %, it is not possible to obtain a moderate filling density. The further desirable range of the amount of the solvent is 35 to 45 wt %.

The inventors of this application tried to produce the upper layer coating solution by use of a two-shaft continuous kneading and mixing machine, but could not produce it successfully. When the double-arm open kneader was used with the optimum range of the amount of the solvent, the kneaded material was not sufficiently viscous and was discharged without being moderately kneaded or mixed. Further, when the two-shaft continuous kneading and mixing machine was used with the optimum range of the amount of the solvent, the surface became too smooth and the aimed running durability was not obtained.

Then, the second magnetic kneaded solution is dispersed by use of the pin type sand grinder, and thereafter it is dispersed by use of the disk type sand grinder.

Figure 2:
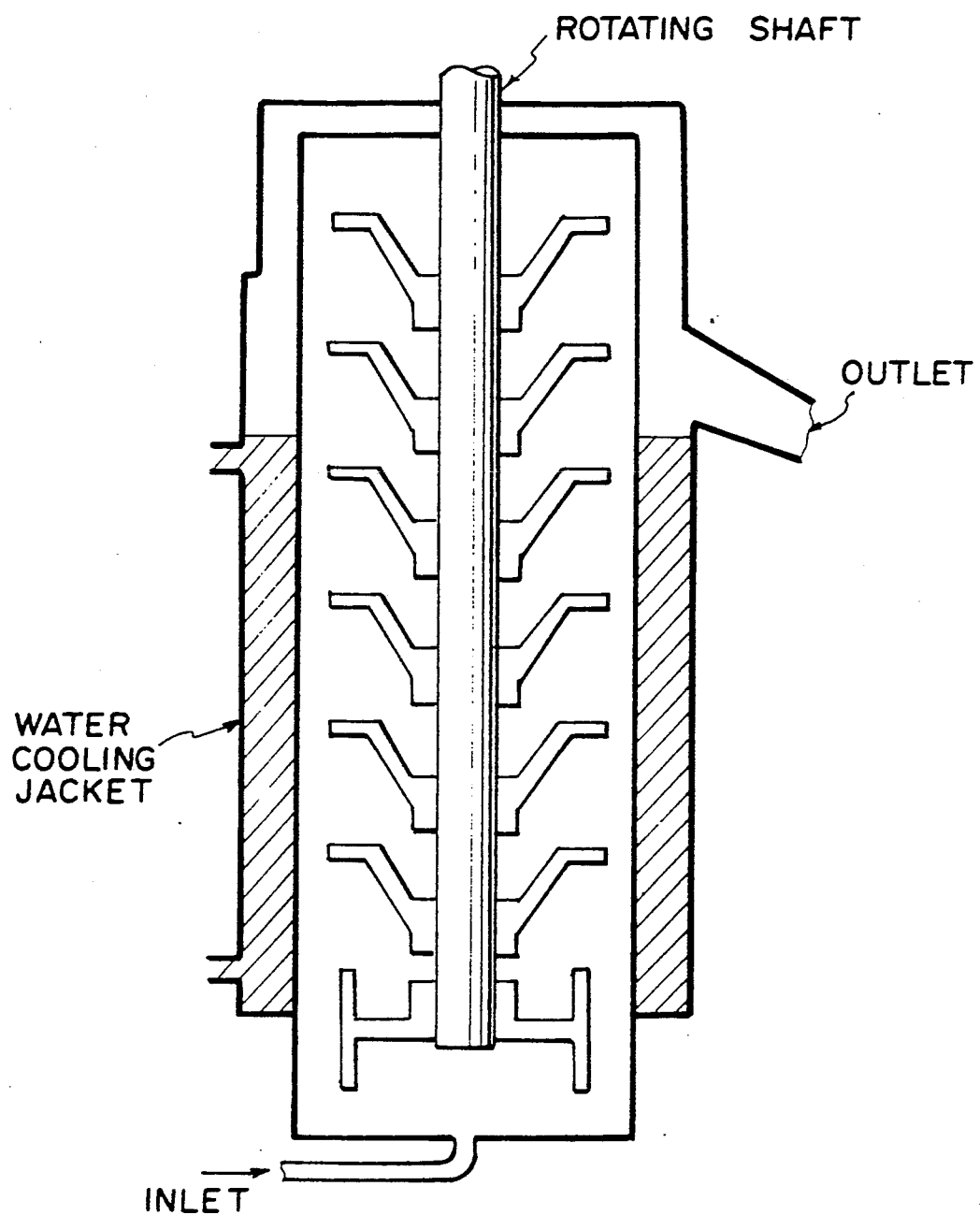
FIG. 2 illustrates a schematic view showing the structure of the disk type sand grinder.

FIG. 2 illustrates the structure of the disk type sand grinder. A sequential layering procedure, in which a conventional first magnetic layer is provided and dried, and thereafter a second magnetic layer is applied on the first magnetic layer, results in an imperfect coating. Therefore, in order to achieve the desired thickness, preferably, a second magnetic layer membrane having a thickness of 1.5 μm or less is provided by means of a simultaneous layering procedure as described in Japanese Unexamined Patent Publication No. 62(1987)-212933.

Preferably, in order to achieve orientation, a solenoid of 1000 G or more and a cobalt magnet of 2000 G or more are used together Further, in order to achieve the highest orientation after drying, it is preferable to provide an appropriate drying process before achieving orientation.

Besides a conventional calendering treatment, it is also preferable to carry out a calendering treatment on the magnetic recording media by passing it between metal rolls at 80° C. or more under a linear pressure of 300 Kg/cm. Although the rolls of the calender are preferably metal rolls, some of them may be heat-resistant plastic rolls, such as those made of epoxy, polyimide, polyamide, polyimide amide, and the like. Preferably, the temperature at which the calendering treatment is carried out is 80° C. or more, and more preferably 100° C. or more. The linear pressure under which the calendering treatment is carried out is preferably 200 Kg/cm, and more preferably 300 Kg/cm or more.

For the magnetic material used in the first and second magnetic layers in accordance with the present invention, well-known ferromagnetic powders such as γ-FeOx (x=1.33-1.5), Co-modified γ-FeOx (x=1.33-1.5), ferromagnetic alloy powders having a predominant constituent (75% or more) composed of Fe, Ni or Co, barium ferrite, strontium ferrite and the like may be used. These ferromagnetic powders may include, in addition to the designated elements, Al, Si, S, Sc, Ti, V, Cr, Cu, Y, Mo, Rh, Pd, Ag, Sn, Sb, Te, Ba, Ta, W, Re, Au, Hg, Pb, B, La, Ce, Pr, Nd, P, Co, Mn, Zn, Ni, Sr, B and the like.

The magnetic material used in the practice of the present invention may be produced in accordance with the conventional procedure. The shape of the magnetic material may be any of acicular, particulate, grainy and plate-like forms.

The binder used in the practice of the present invention may be any of conventional thermoplastic resins, thermosetting resins, reactive resins and the mixture thereof, which are used in both of the first and second magnetic layers.

The thermoplastic resins used are those which have a glass transition temperature ranging from $-100°$ C. to $150°$ C., a number-average molecular weight ranging from 1,000 to 200,000, preferably from 10,000 to 100,000, and a polymerization degree ranging from about 50 to 1,000.

The examples of such thermoplastic resins include polymers and copolymers which have a building unit selected from a group consisting of vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal, vinyl ether and the like, polyurethane resin, and various kinds of rubber resins.

The thermosetting resins and the reactive resins, which can be used in the present invention, include phenolic resin, epoxy resin, polyurethane, urea resin, melamine resin, alkyd resin, acrylic reactive resin, formaldehyde resin, silicone resin, epoxy-polyamide resin, a mixture of polyester resin and isocyanate prepolymer, a mixture of polyester polyol and polyisocyanate, a mixture of polyurethane and polyisocyanate, and the like.

These resins are described in detail in the "Plastic Handbook" published by Asakura Publishing Inc.

A conventional electron-radiation-setting resin may be used in the first or second magnetic layer. The examples of the electron-radiation-setting resin and the process for producing the same are described in detail in Japanese Unexamined Patent Publication No. 62(1987)-256219.

Although the above-mentioned resins may be used singularly or in combination, it is preferred to combine polyurethane resin with at least one selected from a group consisting of vinyl chloride resin, vinyl chloride-vinyl acetate resin, vinyl chloride-vinyl acetate-vinyl alcohol resin and vinyl chloride-vinyl acetate-maleic anhydride copolymer or to combine polyisocyanate therewith.

For polyurethane resin, polyester polyurethane, polyether polyurethane, polyether polyester polyurethane, polycarbonate polyurethane, polyester polycarbonate polyurethane, polycaprolactam polyurethane and the like may be used.

In all the binders provided in the practice of the present invention, in order to obtain excellent dispersibility and durability, if desired, at least one kind of polar radicals selected from a group consisting of COOM, $SO_3M$, $OSO_3M$, $P=O(OM_2)$, $O-P=O(OM)_2$, wherein M is a hydrogen atom or a radical of a salt of alkaline metal, OH, $NR^2$, $N^+R^3$ wherein R is a hydrocarbon radical, epoxy radical, SH, CN and the like is preferably introduced in the binder by copolymerization or addition. The amount of the polar radicals present in the binder is $10^{-1}$–$10^{-8}$ mole/g, and preferably $10^{-2}$–$10^{-6}$ mole/g.

The examples of the binder, which can be used in the present invention, include VAGH, VYHH, VMCH, VAGF, VAGD, VROH, VYES, VYNC, VMCC, XYHL, XYSG, PKHH, PKHJ, PKHC and PKFE which are available from Union Carbide Co., MPR-TA, MPR-TA5, MPR-TAL, MPR-TSN, MPR-TMF, MPR-TS and MPR-TM which are available from Nisshin Kagaku Kogyo K.K., 1000 W, DX80, DX81, DX82 and DX83 which are available from Denki Kagaku K.K , MR110, MR100 and 400 X110A which are available from Nippon Zeon K.K., NIPPORAN N2301, N2302 and N2304 which are available from Nippon Polyurethane K.K., PANDEX T-5105, T-R3080, T-5201, BARNOCK D-400, D-210 -80, CRISVON 6109 and 7209 which are available from Dainippon Ink K.K., U VYLON R8200, UR8300, RV530 and RV280 which are available from Toyobo K.K., DAIFERAMINE 4020, 5020, 5100, 5300, 9020, 9022 and 7020 which are available from Dainippon Seika K.K., MX5004 available from Mitsubishi Kasei K.K., SANPLANE SP-150 available from Sanyo Kasei K.K., SARAN F310 and F210 available from Asahi Kasei K.K., and the like.

In the present invention, the binder is used in an amount of 5-50%, and preferably 10-30%, relative to the magnetic material in each of the first and second magnetic layers. In the case of vinyl chloride resin it is preferable to use it in an amount of 5-30%, in the case of polyurethane resin the preferred amount is 2-20%, and in the case of polyisocyanate the preeerred amount is 2-20%.

When polyurethane is used in the present invention, it is preferred that the polyurethane has a glass transition temperature ranging from $-50°$ C. to $100°$ C., a breaking extension ranging from 100%-2000%, a breaking stress ranging from 0.05 $Kg/cm^2$ to 10 $Kg/cm^2$ and a yield point ranging from 0.05 $Kg/cm^2$ to 10 $Kg/cm^2$.

The magnetic recording medium used in the present invention comprises two layers Therefore, the respective amounts of the binder, vinyl chloride resin, polyurethane resin, polyisocyanate or the other resins present in the binder, and the molecular weight, the amount of the polar radicals and the aforementioned physical properties of each of the resins forming the magnetic layers may be changed according to whether they are used in the first magnetic layer or in the second magnetic layer, if desired.

For polyisocyanate used in the present invention, isocyanate species such as tolylene diisocyanate, 4-4'-diphenyl methane diisocyanate, hexamethylene diisocyanate, xylylene diisocyanate, naphthylene-1,5-diisocyanate, 0-toluidine diisocyanate, isophorone diisocyanate, triphenylmethane triisocyanate and the like, a reaction product of the isocyanate species and polyalcohol, and polyisocyanate produced by condensating the isocyanate species may be used. The examples of the isocyanate species include CORONATE L, CORONATE HL, CORONATE 2030, CORONATE 2031, MILLIONATE MR and MILLIONATE MTL, which are available from Nippon Polyurethane K.K., TAKENATE D-102, TAKENATE D-110N, TAKENATE D-200 and TAKENATE D-202, which are available from Takeda Yakuhin K.K., DESMODUR L, DESMODUR IL, DESMODUR N and DESMODUR HL, which are available from Sumitomo Bayer K.K. In any of the first and second magnetic layers, these isocyanate species may be used singularly or in combination of two or more to make use of the defference of curing reactivity therebetween.

Non-magnetic powders used in the present invention comprise carbon black and abrasive.

For the carbon black used in the present invention, furnace black and thermal black for use in rubber, carbon black for use in coloration, acetylene black, and the like may be use.

The preferred carbon black has a specific surface ranging from 5 $m^2/g$ to 500 $m^2/g$, an oil absorption ranging from 10 ml/100 g to 400 ml/100 g, a particle size ranging from 5 m$\mu$ to 300 m$\mu$, a pH ranging from 2 to 10, a moisture content ranging from 0.1% to 10% and a tap density ranging from 0.1 g/cc to 1 g/cc.

The examples of the carbon black, which can be used in the present invention, include BLACKPEARLS 2000, 1300, 1000, 900, 800, 700 and VULCAN XC-72, which are available from Cabot Co., #80, #60, #55, #50 and #35, which are available from Asahi Carbon K.K., #2400B, #2300, #900, #1000, #30, #40 and #10B, which are available from Mitsubishi Kasei Kogyo K.K., CONDUCTEXSC, RAVEN 150, 50, 40 and 15, which are available from Colombia Carbon Co. The carbon black may be surface-treated with a dispersing agent, or grafted with a resin. Also, a certain portion of the surface of the carbon black may be grafted. Further, the carbon black may be dispersed with the binder prior to adding to the magnetic coating.

The carbon black may be used singularly or in combination in any of the first and second magnetic layers. Preferably, the carbon black is used in an amount of 0.1-30 parts by weight relative to the magnetic material in each of the first and second magnetic layers. The carbon black provides the magnetic layers with antistatic properties and light-shielding properties. Also, the carbon black improves friction properties of the magnetic layers and the strength of the membranes of the magnetic layers. These effects of the carbon black differ according to the particular carbon black used. Thus, the type, amount and combination of the carbon black may be changed based on the aforementioned properties such as the particle size, oil absorption, conductivity, pH value and the like, according to whether it is used in the first magnetic layer or the second magnetic layer. For example, the carbon black having a high conductivity is used in the first magnetic layer to prevent static electrification, and the carbon black having a greater particle size is used in the second magnetic layer to reduce coefficient of friction of the second magnetic layer.

The examples of carbon black, which can be used in the present invention, are described in the "Carbon Black Handbook" published by the Carbon Black Association.

The abrasive, which can be used in the present invention, includes $\alpha$-alumina which contains 90% or more of α-type alumina, β-alumina, silicon carbide, chrome oxide, potassium oxide, α-iron oxide, corundum, artificial diamond, silicon nitride, silicon carbide titanium carbide, titanium oxide, silicon dioxide, and boron nitride, each of which has a Mohs hardness of 6 or more. They may be used singularly or in combination therebetween. Also, a composite of these abrasives (a certain abrasive surface-treated with other abrasives) may be used. Each of these abrasives may contain compounds or elements other than those constituting a major component as long as the major component comprises 90% of the total components. The abrasive, which can be used in the present invention, preferably has a particle size ranging from 0.01 $\mu$m to 2 $\mu$m. However, a combination of a plurality of abrasives having different particle sizes from each other may be used, if desired. Also, a single abrasive having a broad range of particle sizes may be used. It is preferred that the abrasive has a tap density ranging from 0.3 g/cc to 2 g/cc, a moisture content ranging from 0.1% to 5%, a pH value ranging from 2 to 11 and a specific surface ranging from 1 $m^2$/g to 30 $m^2$/g.

The abrasive, which can be used in the present invention, may have any of acicular, spherical and cubic shapes. However, it is preferred that the abrasive has at least one sharp edge on the surface thereof, which enhances the abrasive action of the abrasive.

The examples of the abrasive, which can be used in the present invention, include AKP-20, AKP-30, AKP-50 and HIT-50, which are available from Sumitomo Kagaku K.K., G5, G7 and S-1, which are available from Nippon Kagaku Kogyo K.K., and 100 ED and 140 ED, which are available from Toda Kogyo K.K.

The abrasive may be changed in its kind and amount according to whether it is used in the first magnetic layer or the second magnetic layer. Also, the combination of the abrasive may be changed according to whether it is used in the first magnetic layer or the second magnetic layer. For example, in the case where high durability of the surface of the magnetic layer is desired, the amount of the abrasive to be added to the second magnetic layer is increased. In the case where high durability of the sides of the magnetic layer, the amount of the abrasive to be added to the first magnetic layer is increased.

The abrasive may be added to the magnetic coating after it has been dispersed with the binder.

The amount of the abrasive present in the surface or the side of the magnetic recording medium in accordance with the present invention is preferably 5 pieces/100 $\mu m^2$ or more.

The other additives such as dispersant and lubricant, e.g. fatty acid, fatty ester and organic silicone, may be used.

Organic solvent, which can be used in the present invention, includes ketone such as acetone, methyl ethyl ketone, methyl isobutyl ketone, diisobutyl ketone, cyclohexanone, isophorone and tetrahydrofuran; alcohol such as methanol, ethanol, propanol, butanol, isobutyl alcohol, isopropyl alcohol and methyl cyclohexanol; ester such as methyl acetate, ethyl acetate, isobutyl acetate, isopropyl acetate, ethyl lactate and glycol acetate; glycol ether series such as glycol dimethyl ether, glycol monoethyl ether and dioxane; aromatic hydrocarbon such as benzene, toluene, xylene, cresol and cyclobenzene; chlorinated bydrocarbon such as methylene chloride, ethylene chloride, carbon tetrachloride, chloroform, ethylene chlorohydrin and dicyclobenzene; N,N-dimethylformamide; and hexane. They may be used singularly or in combination at a desired ratio.

The organic solvent used is not necessarily 100% pure and may contain impurities such as isomers, unreacted products, by-products, decomposition products, oxidates, moisture and the like. Preferably, the content of the total impurities is 30% or less, and more preferably 10% or less.

The organic solvent may be changed in its kind and amount according to whether it is used in the first magnetic layer or the second magnetic layer. For example, a highly volatile solvent may be used in the first magnetic layer to improve the smoothness, a solvent having a high surface tension, such as cyclohexanone, dioxane and the like, may be used in the first magnetic layer to enhance the stability of the coating, and a solvent having a high solubility parameter may be used in the second magnetic layer to increase a filling density of the second magnetic layer.

In the method according to the present invention, the two-shaft continuous kneading and mixing machine, which can carry out intensive kneading, and the pin type sand grinder, which can efficiently produce a highly dispersed dispersion for a short time, are used together to knead and mix the magnetic coating solution, resulting in the highly homogeneous lower layer thereby increasing the filling density of the magnetic material in the lower layer. Therefore, the electromagnetic conversion characteristics of the lower layer magnetic coating ca be improved, and the smoothness of the upper layer can be enhanced because of the secured smoothness of the lower layer.

Also, in the method according to the present invention the double-arm open kneader, which has a moderate kneading capability, is used, then the pin type sand grinder, which has the aforementioned capabilities, is used to disperse the magnetic coating solution, and further the disk type sand grinder is used, resulting in the moderately homogeneous upper layer, which can be produced efficiently for a short time. Thus, the upper layer has a moderate filling density of the magnetic material, whereby the upper layer magnetic coating can have the electromagnetic conversion characteristics and the running durability on a moderate level. In the upper layer, if the filling density becomes too high, the surface becomes too smooth resulting in poor running durability. On the other hand, in the upper layer, if the filling density becomes too low, the sensitivity of the tape degrades. However, in the present invention, since the upper layer is superposed on the lower layer, the magnetic recording media, which have both of the excellent electromagnetic conversion characteristics and the excellent running durability, can be produced.

One of the features of the present invention lies in that the pin type sand grinder is used to disperse the magnetic coating solution for the upper layer followed by dispersing the resulting dispersion with the disk type sand grinder. The reasons for the provision of the multiple dispersing processes will hereinbelow be explained.

It takes much longer time to disperse the magnetic coating solution only with the disk type sand grinder, resulting in breaking of the ferromagnetic particles. Also, if the magnetic coating solution is dispersed only with the pin type sand grinder, the particles present in the magnetic coating solution are divided into too fine particles corresponding to primary particles. Therefore, in the present invention, with the pin type sand grinder the particles present in the magnetic coating solution are quickly divided into the condition where there are primary and secondary particles as well as agglomerates in a mixed state, and then the agglomerates are divided into the level of the secondary particles, resulting in the enhanced filling density and smoothness necessary for the magnetic layer of the upper layer. By combining the upper and lower layers which have the aforementioned respective excellent properties, the magnetic recording media, which have the improved electromagnetic transducing characteristics as well as the enhanced running durability, can be produced in accordance with the present invention.

DESCRIPTION OF THE PREFERRED EMBODIMENTS

The present invention will hereinbelow be described in further detail based on the preferred embodiments.

EXAMPLE

A magnetic coating solution was prepared using the solvent as indicated in Table 1 and the following composition to form some samples.

UPPER LAYER COATING SOLUTION

| | |
|---|---|
| Co-γ-Fe$_2$O$_3$ (Hc = 70Oe, specific surface as determined by BET procedure = 40 m$^2$/g) | 100 parts by weight |
| Vinyl chloride-vinyl acetate-vinyl alcohol copolymer (MPR-TA available from Nisshin Kagaku Kogyo K.K.) | 12 parts by weight |
| Carbon black (average particle size = 30 mµ) | 2 parts by weight |
| Abrasive (AKP-20 available from Sumitomo Kagaku K.K.) | 1 part by weight |
| Methyl ethyl ketone/cyclohexanone mixture solvent (mixing ratio is 1:1 in terms of weight) | X parts by weight |

The composition having the above constituents was introduced into a double-arm open kneader, kneaded and mixed for 3 hours, diluted with the following composition, and removed from the double-arm open kneader. Then, the resulting mixture was dispersed by processing it twice with a pin type sand grinder, and further dispersed by processing it six times with a disk type sand grinder.

DILUTING COMPOSITION

Polyesterpolyurethane resin 3 parts by weight
Myristic acid 1 part by weight
Fatty acid-modified silicone 2 parts by weight
Butyl acetate 100 parts by weight
Methyl ethyl ketone 53 parts by weight
   3 parts by weight of polyisocyanate compound (CO-RONATE L available from Nippon Polyurethane K.K.) was added to the resulting dispersion, which was filtered through a filter having an average pore size of 1 µm to obtain the upper layer coating solution.

LOWER LAYER COATING SOLUTION

| | |
|---|---|
| Co-γ-Fe$_2$O$_3$ (Hc = 55Oe, specific surface as determined by BET procedure = 30 m$^2$/g) | 100 parts by weight |
| Amino group-containing vinyl chloride-vinyl acetate-maleic anhydride copolymer (MPR-TAO available from Nisshin Kagaku Kogyo K.K.) | 12 parts by weight |
| Abrasive (AKP-20 available from Sumitomo Kagaku K.K.) | 1 part by weight |
| Methyl ethyl ketone/cyclohexanone mixture solvent (mixing ratio is 1:1 in terms of weight) | Y parts by weight |

The power component other than the solvent component in the above composition was mixed in Henschel mixer. Then, the resulting mixture and the solvent were introduced into the two-shaft continuous kneading and mixing machine through the respective inlets and kneaded together. The resulting kneaded product was introduced into another two-shaft continuous kneading and mixing machine, diluted with the following composition and removed from the two-shaft continuous kneading and mixing machine. The resulting product was dispersed by processing it six times with the pin type sand grinder.

DILUTING COMPOSITION

Polyester polyurethane resin 3 parts by weight
Butyl acetate 100 parts by weight
Methyl ethyl ketone 73 parts by weight The resulting dispersion was filtered through a filter having an average pore size of 1 µm to obtain the lower layer coating solution.

The resulting upper layer and lower layer coating solutions were applied substantially simultaneously on a non-magnetic support in such a way that the thickness of the upper layer is 2 µm and the thickness of the lower layer is 3 µm. Then, the resulting composite was oriented and dried followed by a super-calender treatment. The resulting product was slit into pieces each having a 3.8 mm width, which was installed in an audio compact cassette shell to produce an audio cassette tape.

COMPARATIVE EXAMPLES

1. Comparative Example 1

An audio cassette tape was prepared, using the same compositions for the coating solutions and the same procedure as in the above Example, except that the two-shaft continuous kneading and mixing machine was used in kneading both the upper layer coating solution and the lower layer coating solution.

2. Comparative Example 2

An audio cassette tape was prepared, using the same compositions for the coating solutions and the same procedure as in the above Example, except that the double-arm open kneader was used in kneading both the upper layer coating solution and the lower layer coating solution.

3. Comparative Example 3

An audio cassette tape was prepared, using the same compositions for the coating solutions and the same procedure as in the Example, except that the two-shaft continuous kneading and mixing machine was used in kneading for the upper layer coating solution and that the double-arm open kneader was used in kneading the lower layer coating solution.

Tables 1 and 2, which are set forth hereinbelow, show kneadability of the kneaded products, as well as running durability, smoothness and electromagnetic transducing characteristics of the audio cassette tape.

The conditions under which the above data were determined are as follows:

KNEADABILITY

The products kneaded with the two-shaft continuous kneading and mixing machine were classified into the following ratings by visual inspection (item E of Tables 1 and 2).

- AA: kneadable, highly viscous and semifluid like fresh rice cake
- BB: kneadable, highly viscous and semifluid like fresh rice cake, but not practical due to generation of heat of 80° C. or more during kneading
- CC: kneadable, but rather lowly viscous and fluid and thus not appropriately kneaded
- DD: unkneadable, remaining in finely particulate form The products kneaded with the double-arm open kneader were classified into the following ratings by visual inspection (item B of Tables 1 and 2).

- AA: kneadable, highly viscous and semifluid like fresh rice cake
- BB: kneadable, but not practical due to the need for long kneading time of 180 minutes or more
- CC: kneadable, but rather lowly viscous and fluid and thus not appropriately kneaded
- DD: unkneadable, remaining in finely particulate form

RUNNING DURABILITY

Each sample of the audio cassette tapes was fed forwardly at a reproducing rate of 4.8 cm/s for 60 seconds with JCK-50 tape deck available from Sharp Co. and then fed backward at the same rate for the same period as in the forward feed with JCR-50. This reciprocating motion was referred to as 1 round. The running durability was evaluated by determining by how many rounds each sample could be fed until it stopped due to the high tension load caused by the increase in friction coefficient of the tape, which is indicative of the deterioration of the tape.

- A: 400 rounds or more
- B: less than 400 rounds but at least 300 rounds
- C: less than 300 rounds

ELECTROMAGNETIC TRANSDUCING CHARACTERISTICS

A sine wave signal of 315 Hz was loaded with the specified bias and was recorded on each sample of the audio cassette takes while increasing the input level of the sine wave signal. The output level of the signal recorded on the sample was measured when the output level of the third order harmonics was 3% of the output level of the sine wave signal. No. 4 sample shown in Table 1 constituted a reference tape.

SMOOTHNESS

The smoothness was determined under an incident angle of 60° in accordance with the procedure prescribed by JIS-Z 8741. The values shown in the Tables were reported on the basis that the specular glossiness of a glass surface having a refractive index of 1.56 is 100%.

TABLE 1

| sample No. | amount of solvent X (%) | amount of solvent Y (%) | kneadability E | kneadability F | running durability | electromagnetic transducing characteristics (dB) | smoothness |
|---|---|---|---|---|---|---|---|
| Example | | | | | | | |
| 1 | 17 | 32 | AA | AA | A | 0.6 | 160 |
| 2 | 20 | 34 | AA | AA | A | 0.4 | 160 |
| 3 | 24 | 34 | AA | AA | A | 0.1 | 159 |
| 4 | 24 | 36 | AA | AA | A | 0 | 158 |
| 5 | 24 | 40 | AA | AA | A | 0 | 157 |
| 6 | 28 | 36 | AA | AA | A | −0.1 | 158 |
| 7 | 28 | 45 | AA | AA | A | −0.3 | 154 |

TABLE 2

| sample No. | amount of solvent X (%) | amount of solvent Y (%) | kneadability E | kneadability F | running durability | electromagnetic transducing | smoothness |
|---|---|---|---|---|---|---|---|
| Comparative Example 1 | | | | | | | |
| 21 | 17 | 17 | AA | AA | B | 1.5 | 190 |
| 22 | 20 | 17 | AA | AA | B | 1.2 | 189 |
| 23 | 24 | 24 | AA | AA | B | 0.9 | 183 |
| 24 | 24 | 28 | AA | AA | B | 0.8 | 181 |
| Comparative Example 2 | | | | | | | |
| 29 | 32 | 34 | AA | AA | B | −0.5 | 187 |
| 30 | 34 | 34 | AA | AA | B | −0.6 | 184 |
| 31 | 36 | 34 | AA | AA | B | −0.6 | 180 |
| 32 | 38 | 38 | AA | AA | B · | −0.8 | 178 |
| Comparative Example 3 | | | | | | | |
| 25 | 17 | 34 | AA | AA | A | 0.2 | 159 |
| 26 | 36 | 20 | AA | AA | A | 0.1 | 158 |
| 27 | 36 | 24 | AA | AA | A | −0.1 | 158 |
| 28 | 40 | 24 | AA | AA | A | −0.1 | 157 |

As can be seen from Tables 1 and 2, the method according to the present invention can produce the magnetic recording media which have a excellent running durability as well as excellent electromagnetic transducing characteristics.

We claim:

1. A method of producing a magnetic recording medium comprising steps of kneading and dispersing ferromagnetic powder, binder and non-ferromagnetic powder to obtain magnetic coating solutions, and applying a plurality of the magnetic coating solutions on a non-ferromagnetic substrate to form a plurality of magnetic layers on the substrate, wherein, in the step of said kneading and dispersing, a magnetic coating composition containing said ferromagnetic powder and a solvent of 15 to 30 wt % of the ferromagnetic powder is at first kneaded by a two-shaft continuous kneading and mixing machine and then dispersed by a pin type sand grinder to obtain a first magnetic solution, and another magnetic coating composition containing said ferromagnetic powder and a solvent of 30 to 50 wt % of the ferromagnetic powder is at first, kneaded by a double-arm open kneader and then dispersed by a pin type sand grinder, and finally dispersed by a disk type sand grinder to obtain a second magnetic coating solution, and, in the step of said applying the magnetic solutions on the non-ferromagnetic substrate, said first magnetic coating solution is at first applied on said substrate and then said second magnetic coating solution is applied thereon.

2. A method of producing magnetic recording medium as defined in claim 1 wherein said first magnetic coating solution and said second magnetic coating solution are applied on the substrate by means of a double coating method while the first magnetic coating solution applied on the substrate is wet.

3. A method of producing a magnetic recording medium as defined in claim 1 wherein the ferromagnetic powder in the second magnetic coating solution has a specific surface of 30 $m^2/g$ or more as determined by the BET procedure and a crystal size of 400Å or less; the ferromagnetic powder in the first magnetic coating solution has a specific surface of 45 $m^2/g$ or less as determined by the BET procedure and a crystal size of 290Å or more; and the specific surface of the ferromagnetic powder in the second magnetic coating solution is greater than that of the ferromagnetic powder in the first magnetic coating solution by 5 $m^2/g$ or more.

4. A method of producing a magnetic recording medium as defined in claim 1 wherein Hc of the ferromagnetic powder in the second magnetic coating solution is 1000 Oe or less; Hc of the ferromagnetic powder in the first magnetic coating solution is 300 Oe or more; and the difference of Hc between the ferromagnetic powder in the second magnetic coating solution and the ferromagnetic powder in the first magnetic coating solution is on the order of 50-200 Oe.

5. A method of producing a magnetic recording medium as defined in claim 1 wherein the ferromagnetic powder in the second magnetic coating solution is cobalt-modified $\gamma$-$Fe_2O_3$, and the ferromagnetic powder in the first magnetic coating solution is $\gamma$-$Fe_2O_3$ or cobalt-modified $\gamma$-$Fe_2O_3$.

6. A method of producing a magnetic recording medium as defined in claim 1 wherein the binder used in each of the first and second magnetic coating solutions comprises a vinyl chloride vinyl acetate copolymer and polyester polyurethane, and the total amount of the binder used is 15-30 wt % relative to the ferromagnetic powder.

7. A method of producing a magnetic recording medium as defined in claim 6 wherein polyisocyanate compounds are added to each of the coating solutions in an amount of 1-10 wt % relative to the ferromagnetic powder to carry out a crosslinking processing.

8. A method of producing a magnetic recording medium as defined in claim 1 wherein carbon black is included in the upper layer coating solution in an amount of 0.5-10 wt % relative to the ferromagnetic powder, and, the average particle size of the carbon black ranges from 20 m$\mu$ to 80 m$\mu$.

9. A method of producing a magnetic recording medium as defined in claim 8 wherein additional carbon black having an average particle size ranging from 80 m$\mu$ to 300 m$\mu$ is included in an amount less than 0.5 wt % relative to the ferromagnetic powder.

10. A method of producing a magnetic recording medium as defined in claim 8 wherein said carbon black is included in the first magnetic coating solution.

11. A method of producing a magnetic recording medium as defined in claim 10 wherein the carbon black is included in the first magnetic coating solution in an amount of 10 wt % or less, the average particle size thereof being 80 m$\mu$ or less.

12. A method of producing a magnetic recording medium as defined in claim 1 wherein the thickness of the upper layer made of the first magnetic coating solution is 3.0 $\mu$m or less, and the thickness of the lower layer made of the second magnetic coating solution is 2.0 $\mu$m or more.

13. A method of producing a magnetic recording medium as defined in claim 1 wherein an abrasive having a Mohs hardness of 7 or more is included in said first and second magnetic coating solutions.

14. A method of producing a magnetic recording medium as defined in claim 1 wherein the total amount of the lubricant included in the first magnetic coating solution is equal to or greater than the total amount of the lubricant included in the second magnetic coating solution.

* * * * *